(12) United States Patent
Steere et al.

(10) Patent No.: US 7,076,611 B2
(45) Date of Patent: Jul. 11, 2006

(54) SYSTEM AND METHOD FOR MANAGING OBJECTS STORED IN A CACHE

(75) Inventors: David C. Steere, Bellevue, WA (US); Brian S. Aust, Redmond, WA (US); Yun Lin, Kirkland, WA (US); Mohammed Samji, Bellevue, WA (US); Navjot Virk, Bellevue, WA (US); Shishir P. Pardikar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 10/632,386

(22) Filed: Aug. 1, 2003

(65) Prior Publication Data

US 2005/0027943 A1    Feb. 3, 2005

(51) Int. Cl.
   *G06F 12/00*   (2006.01)
   *G06F 7/00*    (2006.01)
(52) U.S. Cl. .................... 711/133; 711/118; 711/154
(58) Field of Classification Search ............... 711/100, 711/117, 133, 134, 135, 154; 707/100
See application file for complete search history.

(56) References Cited

U.S. PATENT DOCUMENTS

| 4,980,816 | A  | * | 12/1990 | Fukuzawa et al. | .......... | 711/207 |
| 6,101,576 | A  | * | 8/2000  | Kobayashi et al. | ......... | 711/122 |
| 6,640,286 | B1 | * | 10/2003 | Kawamoto et al. | ......... | 711/133 |
| 6,701,461 | B1 | * | 3/2004  | Oura | .......................... | 714/42 |
| 2002/0053006 | A1 | * | 5/2002 | Kawamoto et al. | ......... | 711/128 |
| 2005/0055633 | A1 | * | 3/2005 | Ali et al. | ..................... | 715/513 |

OTHER PUBLICATIONS

Bob Rogers, "Storage Policy Management: Definitions and Details; Policy Management Affects All Levels of the Storage Hierarchy from Disk Array Controllers to High-Level Storage Management Software," May 1, 2002, *PennWell Publishing Co.* (5 pages).
Yangjun Chen et al. "Personal Web Space," 2002, *IEEE* (7 pages).
Kelvin Lau et al "A Client- Based Web-Cache Management System," 2002, *Springer-Verlag* (10 pages).
Lionel Brunie et al., "Semantic Collaborative Web Caching," 2002, *IEEE*, (12 pages).
Ilhoon Shin et al., "Efficient Cache Management in Database Utilizing Block Reference Characteristics," Feb. 18-21, 2002 (11 pages).

* cited by examiner

*Primary Examiner*—Tuan V. Thai
(74) *Attorney, Agent, or Firm*—Merchant & Gould PC

(57) ABSTRACT

The present invention is directed at a system and method for managing and evicting objects stored in a cache. The invention provides a mechanism for determining which objects to evict based on a weight that is calculated for each object stored in the cache. The weight is determined by at least two factors, including file size, file type, primary user, last access time, and the like, and by the relative importance of each of the factors. The weight for each object may be determined autonomously and/or may be determined upon a trigger event. The factors and their relative importance may be obtained from a policy applicable to one or several computers.

32 Claims, 7 Drawing Sheets

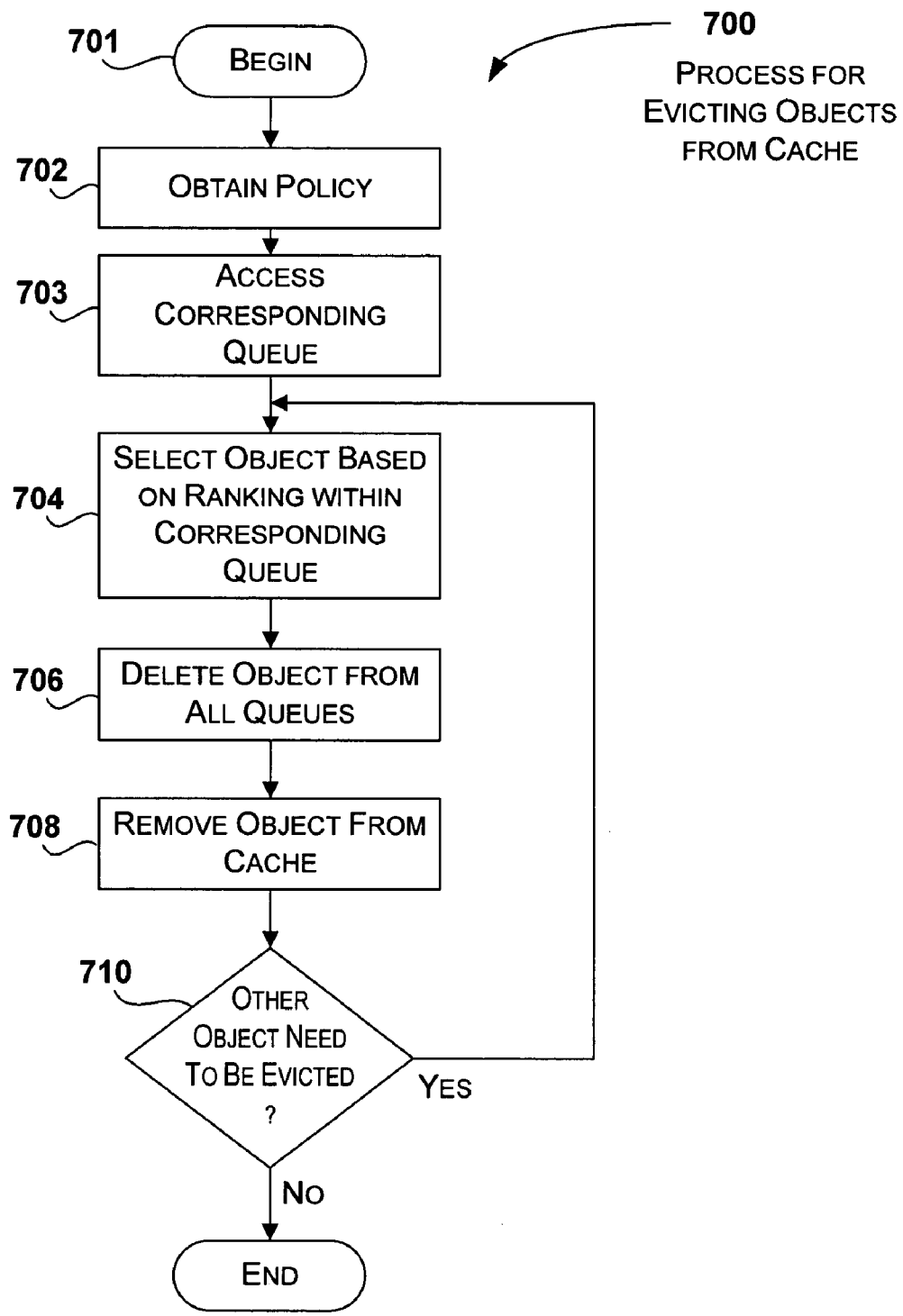

SYSTEM AND METHOD FOR MANAGING OBJECTS STORED IN A CACHE

BACKGROUND OF THE INVENTION

Distributed networks (e.g., the Internet) are very common. In a distributed network, there are one or more client computers and one or more server computers. The server computers store content that is of interest to the client computers. The content includes HyperText Markup Language (HTML) pages, image files, word processing files, and other objects. In order to obtain this content, a client computer sends a request to a server computer (e.g., via a link). The request specifies a desired object residing on the server computer. The server computer replies and the object is downloaded to the client computer.

In order to facilitate faster interaction between the server computer and the client computer, client-side caching (CSC) techniques have been developed to cache objects once the objects have been downloaded. For example, when client side caching is available, the client computer may first check its cache to determine whether a copy of the specified object has already been stored locally in the cache from a previous download. If the object has already been stored in the cache, the client computer may use the cached object, rather than downloading the object again. Thus, the client computer saves time because some of the content does not need to be downloaded. This results in faster interactions between the server computer and the client computer.

In addition to increasing interaction times between the server computer and the client computer, client-side caching may also allow offline access to objects. For example, if the client-side caching implements persistent caches, objects that have been cached may be available to a user on the client computer when the client computer is not connected to the server computer. The number of objects that can be stored in the persistent cache depends on the size of the cache. Typically, the cache is a certain percentage of the disk space or may be a fixed size. Once the cache becomes full, some of the objects stored in the cache are removed (i.e., evicted) in order to provide cache space for the new objects.

Currently, objects are evicted based on the time when the object was last accessed. Thus, objects that have been accessed most recently are kept in the cache and objects that have the longest time since being assessed are evicted. Objects are evicted until there is sufficient cache space available. For some implementations, users may specifically request that an object always remains in the cache, commonly referred to as "pinning". These "pinned" objects are not evicted from the cache. In some cases, the "pinned" objects may be stored separately from the cache, such as in user space.

Until the present invention, a more sophisticated method for managing and evicting objects from the cache has eluded those skilled in the art.

SUMMARY OF THE INVENTION

The present invention is directed at a system and method for managing and evicting objects stored in a cache. The invention provides a mechanism for determining which objects to evict based on a weight that is calculated for each object stored in the cache. The weight is determined by at least two factors, including file size, file type, primary user, last access time, and the like, and by the relative importance of each of the factors. The weight for each object may be determined autonomously and/or may be determined upon a trigger event. The factors and their relative importance may be obtained from a policy applicable to one or several computers. When the factors are specified in a policy, the client computers do not need to be individually configured for the proper eviction behavior. In large enterprises, this policy driven eviction mechanism requires less administrative overhead, which results in significant savings.

BRIEF DESCRIPTION OF THE DRAWINGS

FIG. 7 is a logical flow diagram illustrating a process for evicting objects from a cache in accordance with one embodiment of the present invention.

DETAILED DESCRIPTION OF THE PREFERRED EMBODIMENT

The present invention is directed at a system and method for managing objects stored in a cache. The invention provides a mechanism for determining which objects to evict. The mechanism bases this determination on a weight that is calculated for each object that is stored in the cache. The weight may be affected by many factors, such as file size, file type, primary user, last access time, and the like. The weight for each object may be determined autonomously and/or may be determined upon a trigger event, such as updating the object. In addition, the factors may be obtained from a policy.

The following description is divided into two parts. The first part of the description describes an illustrative computing environment in which the present invention may operate. The second part of the description describes one illustrative implementation of the present invention.

Illustrative Computing Environment

Figure 1:
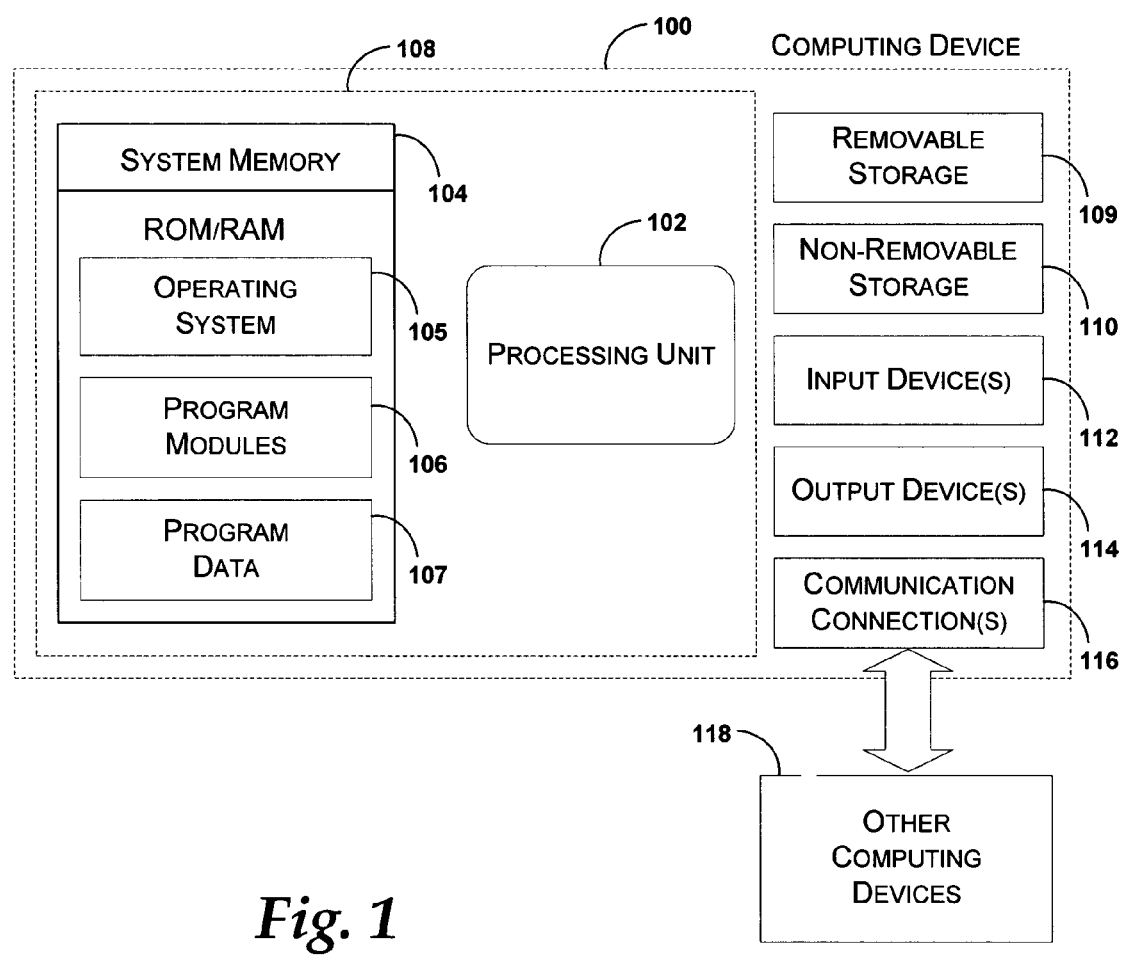
FIG. 1 illustrates an exemplary computing device that may be used in illustrative implementations of the present invention.

FIG. 1 illustrates an exemplary computing device that may be used in illustrative implementations of the present invention. With reference to FIG. 1, in a very basic configuration, computing device 100 typically includes at least one processing unit 102 and system memory 104. Depending on the exact configuration and type of computing device 100, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, a word processor, and the like. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device 100 to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation

Figure 2:
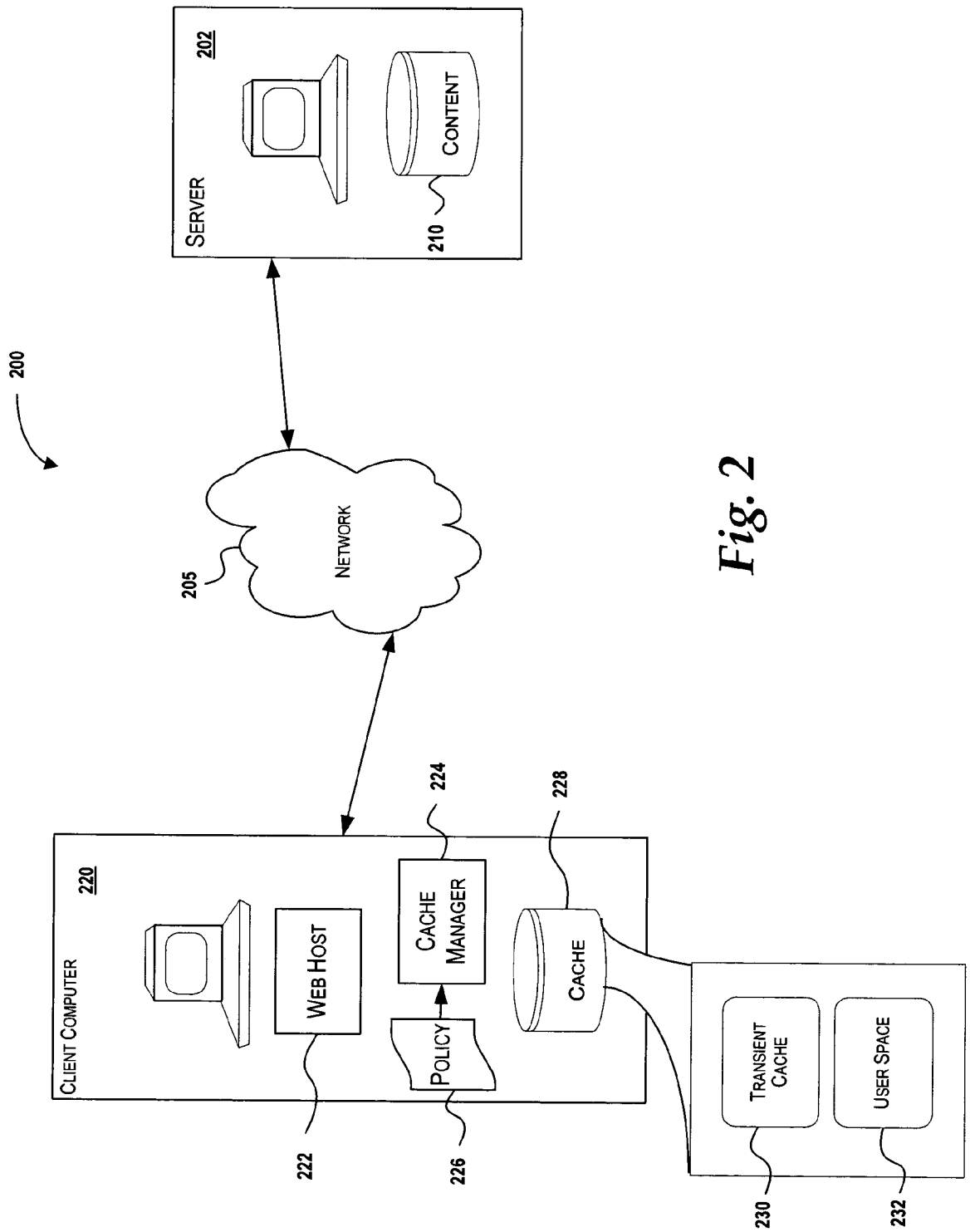
FIG. 2 is a functional block diagram overview of a distributed networking environment in which implementations of the invention may be embodied.

FIG. 2 is a functional block diagram overview of a distributed networking environment 200 in which implementations of the invention may be embodied. As illustrated in FIG. 2, two or more computers, such as a server computer (hereinafter referred to as server 202) and a client computer 220, are connected over a network 205. Server 202 and client computer 220 may be computing devices such as the one described above in conjunction with FIG. 1. The computers may be connected in a corporate environment, where the network 205 may be a local area network or a wide area network. Similarly, the computers may be arbitrarily connected over a wide area network, such as the Internet.

The server 202 is a computing device that is configured to make resources available to other computing devices connected to the network 205. The server 202 may include Web serving software to serve Internet related resources, such as HyperText Markup Language (HTML) documents and the like. The server 202 includes storage for storing these resources (i.e., content 210). The server 202 makes the content 210 available over the network 205 to other computing devices (e.g., client computer 220).

The client computer 220 is a computing device configured to execute locally running applications as well as connect to other computers over the network 205. As shown, the client computer 220 includes a cache 228. The cache may be physically located in RAM, a hard disk, or on other computer-readable media. The cache 228 includes a transient cache 230 and may include a user space 232. The user space may be part of the transient cache or may be in a separate location. The transient cache 230 is for persisting content that has been downloaded from server 202. The user space 232 is also for persisting content that has been downloaded from server 202. However, in contrast with the transient cache 230, the content within the user space 232 does not typically undergo an eviction process. Rather, the content stored within user space 232 is "pinned", meaning that it remains available and is not evicted. Thus, the user space 232 may grow to accommodate additional content.

The client computer 220 includes other applications for interacting with other computers over the network. One such application is host software 222, such as Internet browsing software (hereinafter referred to as browser 222). The browser 222 communicates with a cache manager 224. The cache manager 224 is configured to cache content that the browser 224 downloads from server computer 202. Briefly, the cache manager 224 accesses an eviction policy 226. The eviction policy may be a local policy, a group policy, or the like. The eviction policy 226 may be in a number of formats, such as extensible markup language (XML), user interface (UI), text, and the like. One illustrative method for creating an eviction policy 226 is described later in conjunction with FIG. 3. The eviction policy 226 specifies factors for determining how to assign a weight to an object. The eviction policy 226 may include any number of factors. Exemplary factors include, but are not limited to, last accessed time, file type, number of users that have accessed, source server designation, specific directory, file size, name of owner, whether owner is primary user, cost to download, time between updates, a set priority by a user, and the like.

Figure 6:
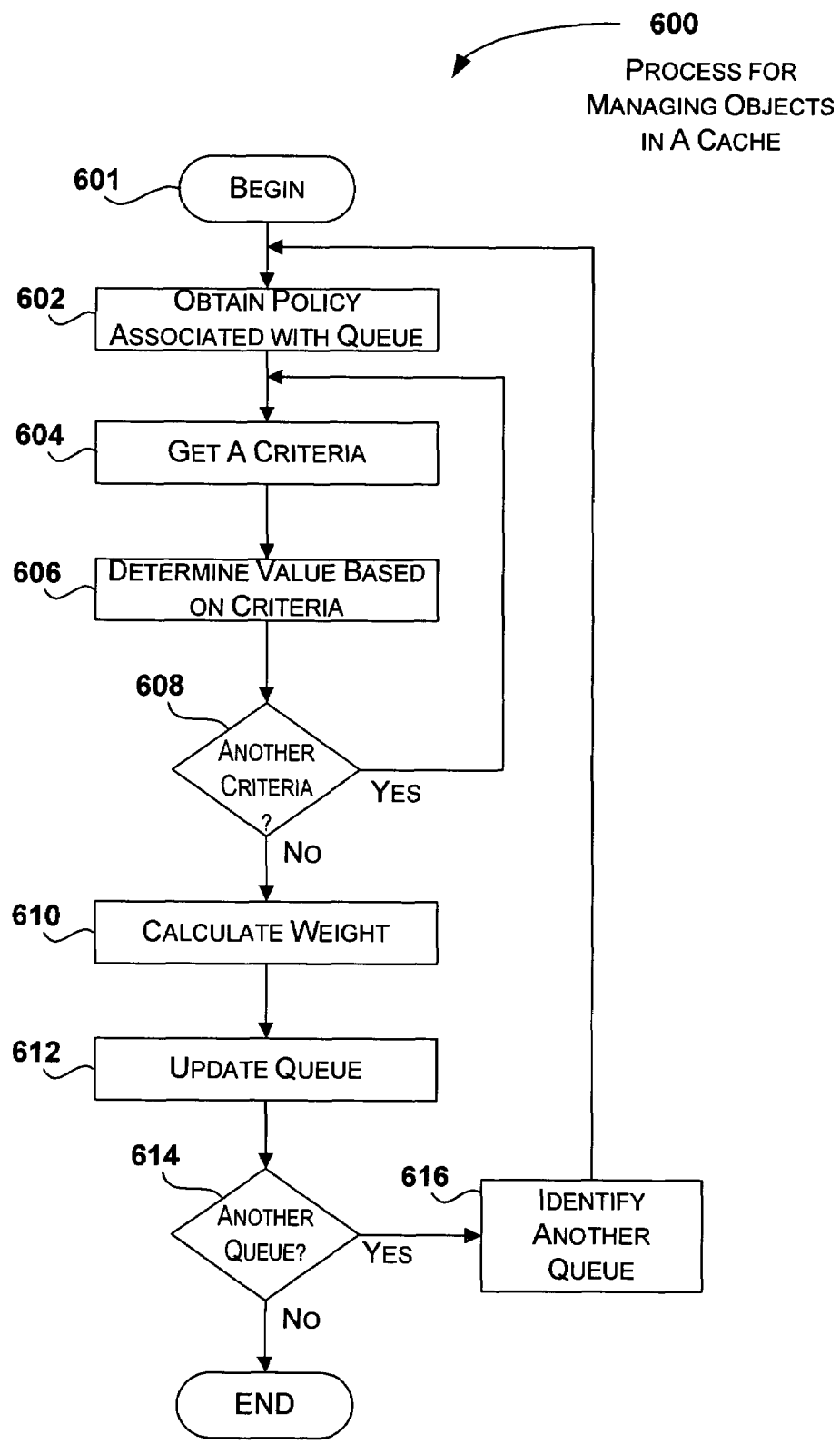
FIG. 6 is a logical flow diagram illustrating a process for managing an object in a cache in accordance with one embodiment of the present invention.

Briefly stated, a user of the client computer 220 may connect to the server 202 in any conventional manner. The server 202 presents a Web page or some other resource that makes available files (i.e., objects) that reside as the content 210 on the server computer 202. In response to a selection of a link or the like by the user, the server 202 navigates to the underlying object. In one embodiment, the cache manager is responsible for determining whether the object already is stored in the cache 228 or whether the object needs to be brought down to the client computer 230 from the server 202. If the object needs to be brought down to the client computer, the cache manager 224 is responsible for determining whether there is sufficient space in the cache 228 for persisting the object. If there is not sufficient space, the cache manager 224 performs an eviction process in accordance with the present invention. If there is sufficient space, the cache manager 224 caches the object in the transient cache 230 and applies a weight to the object in accordance with the present invention. FIGS. 6 and 7 illustrate exemplary flow diagrams for applying a weight and evicting objects, respectively.

Figure 3:
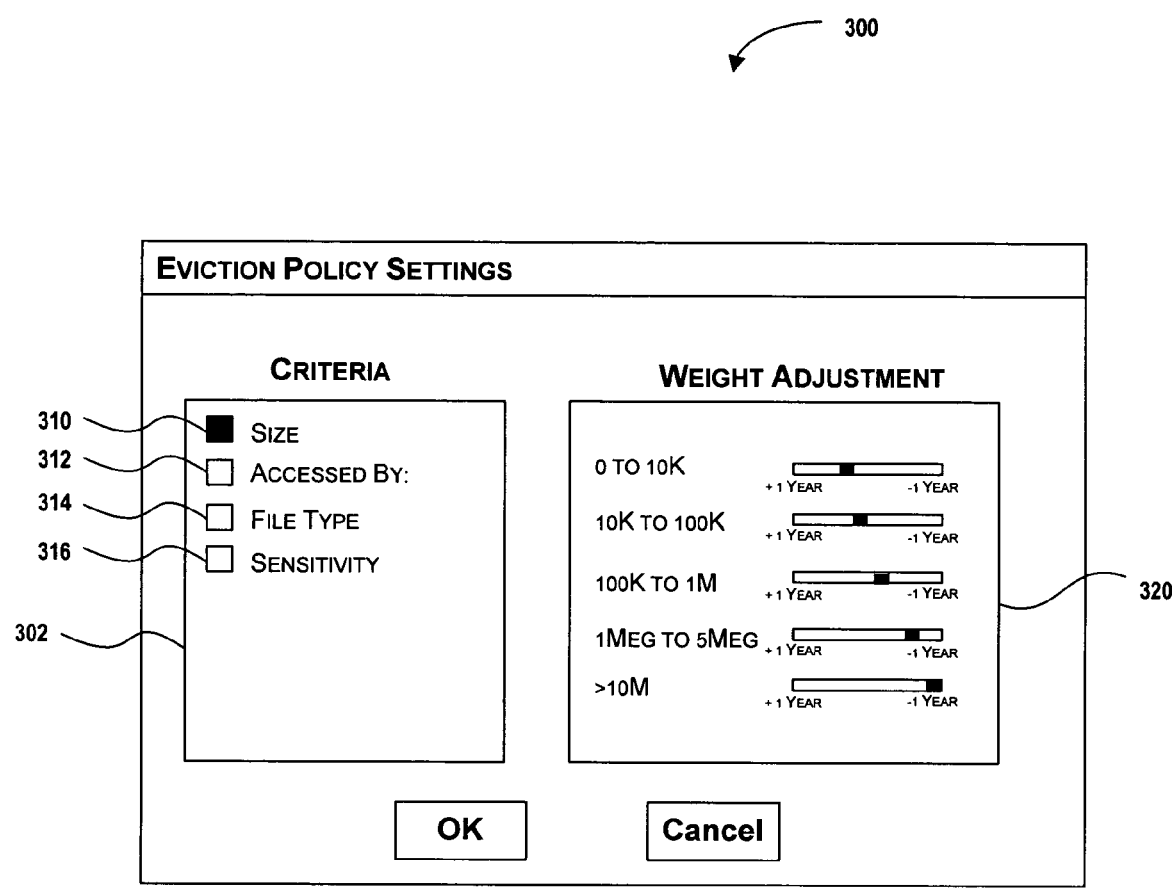
FIG. 3 is an illustrative screen display that may be presented by the cache manager software for specifying the eviction policy in accordance with one implementation of the invention.

FIG. 3 is an illustrative screen display that may be presented by the cache manager software for specifying an eviction policy in accordance with one implementation of the invention. Those skilled in the art will appreciate that various implementations may be used to create an eviction policy, such as a text editor, XML, and the like. The exemplary implementation illustrated in FIG. 3 includes a display 300 that includes a criteria box 302. The criteria box 302 identifies one or more factors (e.g., factors 310–316) that are considered when assigning a weight to an object. Each factor 310–316 has an associated adjustment box (e.g., size adjustment 320). The adjustment box specifies how the criteria should affect the weight. For example, in FIG. 3, the size factor 310 has been selected. Thus, the size adjustment box 320 is illustrated. Within the size adjustment box, a list of file sizes (e.g., 0 to 10K) and associated adjustments are displayed. For example, if the object being evaluated is 15 Kbytes, there is no adjustment made to the weight. However, if the object is greater than 10 Mbytes, an adjustment is made to the weight. One embodiment for calculating the weight of an object based on the factors and the adjustments is illustrated in FIG. 7 and described in conjunction therewith. Although not shown, one skilled in the art will appreciated that each of the other factors (factors 312–316) will have an associated adjustment box that allows a user or a system administrator to set the adjustment for the criteria.

While FIG. 3 illustrates one embodiment for specifying a policy, those skilled in the art will appreciate that other techniques may also be used without departing from the present invention. For example, an XML document may be used to describe the policy. The policy, once defined, may be for a group or may be for a local computer. When the policy is for a group, the system administrator may use the specified policy for each computer within the group. The use of a group policy for defining the eviction mechanism allows uniformity and ease of administration.

Figure 4:
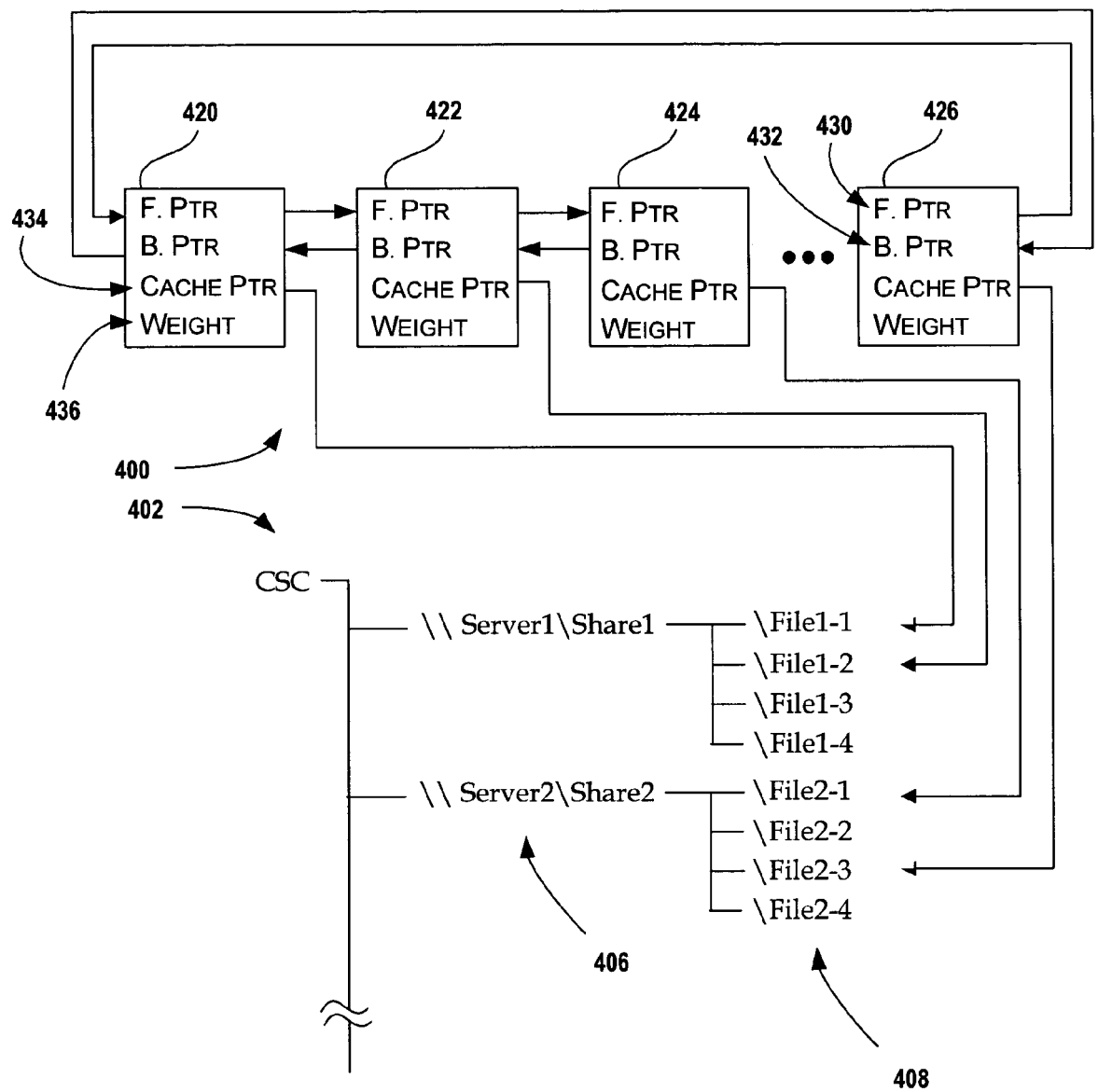
FIG. 4 is a graphical representation of one embodiment for managing cached objects based on weights.

FIG. 4 is a graphical representation of one embodiment for managing cached objects based on weights. A weighted priority queue 400, for this embodiment, is implemented as a doubly linked list. Each link (i.e., links 420–426) includes a forward pointer (e.g., forward pointer 430) and a backward pointer (e.g., backward pointer 432). The forward pointer 430 references the next link and the backward pointer 432 references the previous link. In addition, each link 420–426 includes a cache pointer (e.g., cache pointer 434). The cache pointer 434 references an object that is stored in the cache. Tree 402 graphically illustrates the structure of the objects stored in the cache. Each object is identified by an object name 408 (e.g., File1-1) and is further identified by a path 406 (e.g., "\\Server1\Share1"). The cache pointer 434 then uniquely identifies the object, such as by path 406 and object name 408.

Each link 420–426 in the weighted priority queue 400, in accordance with the present invention, further includes a weight (e.g., weight 436). The weight is assigned based on various factors that are specified in the policy. The links 420–426 in the priority queue 400 are then ranked based on the weight. For example, the links 420–426 may be ranked from the highest to the lowest weight. As will be described below, by ranking them based on weight, the cache manager may efficiently evict lower priority objects from the cache when necessary.

Figure 5:
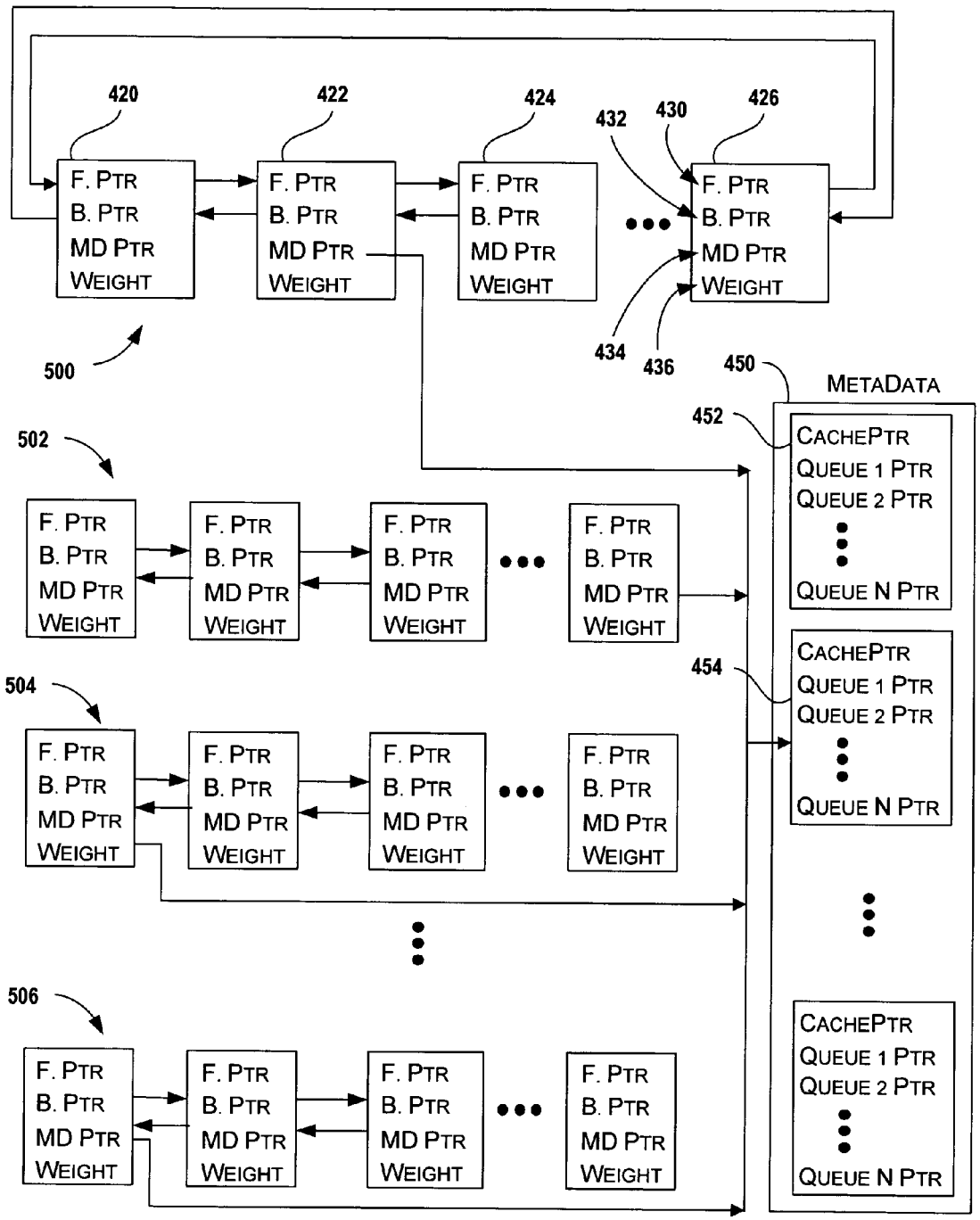
FIG. 5 is a graphical representation of another embodiment for managing cached objects based on weights.

FIG. 5 is a graphical representation of another embodiment for managing cached objects based on weights. In this embodiment, there may be several weighted priority queues (e.g., priority queues 500–506). Each priority queue 500–506 represents a different reason for cleaning the cache. For example, one queue may prioritize the objects in order to free up space; another may prioritize objects in order to purge sensitive information, and the like. Each queue has a different policy associated with it and has a different assignment of weights for the objects. Thus, each queue ranks the links based on the factors specified in the associated eviction policy.

In a further refinement, each link in each queue may reference metadata 450. Metadata 450 includes a metadata object (e.g., metadata object 452) for each object in the cache. According to one embodiment, there is one metadata object for each cache entry. The metadata object 452 includes a cachePtr that references the actual object in the cache and a queue pointer to each of the queues 500–506. As will be described in detail below, the metadata object 452 allows an object to be located from any queue, and then easily removed from all the queues. For example, as illustrated, each queue has a link that points to metadata object 454. Thus, if queue 504 is performing an eviction process, the process may identify metadata object 454 for eviction. The metadata object 454 can then be easily used to identify each link in the other queues that need to be removed regardless of the rank/position in those other queues.

FIG. 6 is a logical flow diagram illustrating a process 600 for managing objects in accordance with one embodiment of the present invention. Process 600 may be performed autonomously each time an object is accessed, triggered on some user selection, triggered on some pre-determined event, or the like. In addition, process 600 may be performed when a policy has changed. Process 600 begins at block 601 where the weighting process has been activated in some manner for a specific queue. The process continues at block 602.

At block 602, the eviction policy associated with the specific queue is obtained. The eviction policy may be a local policy or a group policy. The format for the eviction policy may take one of several forms, such as an XML document, a text file, a binary file, and the like. In general, the eviction policy specifies the factors that should be considered when assigning a weight to an object. Processing continues at decision block 604.

At block 604, one of the criteria in the policy is obtained. As illustrated in FIG. 3, each policy may calculate the weight for an object based on several factors. In addition, each criterion will specify an adjustment for the object. Processing continues at block 606.

At block 606, a value for the criteria is determined. In one embodiment, the value is determined by applying an adjustment for the criteria. Referring back to FIG. 3, for example, if a file is 15 MB, the adjustment for the size criteria is one year. Processing continues at decision block 608.

At decision block 608, a determination is made whether the policy includes another criteria. If there is another criteria, processing loops back to block 604 and proceeds as described above for the new criteria. Once a value has been determined for each of the criterion in the policy, processing proceeds to block 610.

At block 610, a weight is calculated for the object. The weight is based on each of the values determined for the criteria. In one embodiment, the weight is calculated by summing each value with the absolute age of the object (e.g., the number of seconds since Jan. 1, 1970). Thus, assuming the object was accessed at time T, the weight would equal the sum of T, the size adjustment value, the owner adjustment value, and other adjustment values. Thus, a very large file that was accessed today may have a weight that is similar to a smaller file that was accessed a month ago. Processing continues at block 612.

At block 612, the queue is updated with the calculated weight. In another embodiment, the metadata may also be updated. For example, if the object is a new object, a new link in the queue may be created and a new metadata object may be created. Processing continues at decision block 614.

At decision block 614, a determination is made whether there is another queue that needs to be updated. Because each queue sorts the objects for its own optimal cache eviction purposes, each queue calculates its own weight and assigns it to the object. Thus, typically, when there are multiple queues, each queue is updated. However, in certain circumstances, only one queue may be updated. For example, if a policy changed and only affected one queue, only the objects in that queue would be updated. Therefore, at decision block 614, if there is not another queue, processing ends. Otherwise, processing continues a block 616.

At block 616, another queue is identified for processing. Processing then loops back to block 602 and proceeds as described above. Because a metadata object already exists for this object, at block 612, the queue pointer in the metadata object is updated to reference the link in the queue that is currently being processed.

Once the weighting process 600 is complete, each queue that needed updating will have been updated with a new weight for the object. One skilled in the art will appreciate that when a policy changes, processing within blocks 604–612 is performed for each object within the cache. The cache manager may now easily determine which objects to evict based on any of the queues, as described below in conjunction with FIG. 7.

FIG. 7 is a logical flow diagram illustrating a process for evicting objects from a cache based on the assigned weight in accordance with one embodiment of the present invention. Process 700 begins at block 701 where the cache manager has determined that some objects need to be evicted from the cache. The process continues at block 702.

At block 702, a policy is obtained based on the reason that the objects need to be evicted. As mentioned above, there may be a policy that weights the objects based on space considerations, sensitive information, and the possibility of being accessed again. Processing continues at block 703.

At block 703, the cache manager accesses the priority queue associated with the policy. Typically, process 700 is entered for a specific purpose, such as making space available for additional objects. Thus, the cache manager knows which queue is responsible for evicting objects based on this purpose (e.g., policy) and accesses that queue. Processing continues at block 704.

At block 704, the cache manager selects an object from within the queue based on its location (i.e., "ranking") within the corresponding queue. For example, in one embodiment in which the corresponding queue is implemented using a doubly linked list ranked by most important, the cache manager begins selecting objects with the lowest importance. Processing continues at block 706.

At block 706, the object is deleted from all the queues. In order to keep the other queues up to date on the objects stored in the cache, if an object is being deleted in one queue, each queue must have the same object deleted. Otherwise, the other queues will contain references to non-existent objects. In the embodiment implementing the metadata, deleting the object from each queue is a relatively straightforward operation. Each queue pointer within the metadata object associated with the object is used to reference the object in the associated queue. That link is then removed from the queue. Processing continues at block 708.

At block 708, the object within the cache is removed. This may involve deleting the object from the cache, setting a flag indicating that the object has been deleted, or the like. Processing continues at decision block 710.

At decision block 710, a determination is made whether other objects need to be evicted. For example, if sufficient space is not available, processing loops back through block 704–708 in order to evict another object. Likewise, if an upper threshold of sensitive information is still resident, processing may loop back through block 704–708 in order to evict another object. Once no more objects need to be evicted, processing continues to the end.

Thus, as described, the present invention provides a method for managing objects that allows efficient eviction of the objects based on their relative importance compared to other objects within the cache. This allows the cache manager to efficiently utilize its cache for important objects as defined by the policy.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable medium encoded with computer-executable instructions for performing a method that manages objects within a cache, the method comprising:
   obtaining a policy associated with the objects, wherein the policy identifies at least two factors for determining a weight for each object;
   determining the weight for each object, wherein the weight is calculated by summing values with an absolute age of the object, and further wherein the values are associated with the factors;
   determining a rank for each object based on the weight;
   storing the rank for each object; and
   deleting a low priority object from within the cache, wherein the low priority object has the lowest rank among the objects.

2. The computer-readable medium of claim 1, wherein the factors are associated with at least one of: storage considerations, sensitive information, and a possibility of being accessed again.

3. The computer-readable medium of claim 1, wherein determining the weight further comprises applying an adjustment to each factor associated with the object.

4. The computer-readable medium of claim 3, wherein the adjustment is obtained from the policy.

5. The computer-readable medium of claim 4, wherein the policy comprises a group policy for several computers.

6. The computer-readable medium of claim 4, wherein the policy is defined via an XML document.

7. The computer-readable medium of claim 4, wherein the policy is defined via a user interface.

8. The computer-readable medium of claim 1, wherein storing the rank comprises storing the weight within a link in a linked list, the link being associated with one object and the link including a reference to the one object that uniquely identifies the one object within the cache.

9. The computer-readable medium of claim 1, wherein the absolute age comprises a number of seconds since a predetermined time.

10. The computer-readable medium of claim 1, wherein the policy describes an adjustment for the factors, the adjustment being used when determining the weight.

11. The computer-readable medium of claim 1, wherein the determining the weight is performed whenever the object is accessed.

12. The computer-readable medium of claim 1, wherein determining the weight is performed whenever the policy that affects the weight determination is changed.

13. A computer-readable medium encoded with computer-executable instructions for performing a meted that evicts objects from a cache, the method comprising:
    obtaining a policy associated with the objects, wherein the policy identifies at least two factors for determining a weight for each object;
    determining the weight for each object, wherein the weight is calculated by summing values with an absolute age of the object, and further wherein the values are associated with the factors;
    accessing a queue corresponding to the policy;
    determining a rank for each object in the queue based on the weight;
    selecting an object within the queue based on the rank of the object within the queue;
    deleting the object from the queue; and
    deleting the object from the cache.

14. The computer-readable medium of claim 13, wherein the policy specifies an adjustment for each factor.

15. The computer-readable medium of claim 13, wherein the policy is a group policy applicable to several computers.

16. The computer-readable medium of claim 13, wherein the policy is defined via an XML document.

17. The computer-readable medium of claim 13, wherein the policy is defined via a user interface.

18. The computer-readable medium of claim 13, wherein selecting the object comprises identifying a link out of a plurality of links in a link list, each of the plurality of links being associated with one of a plurality of objects stored in the cache, the identified link having the lowest importance.

19. The computer-readable medium of claim 13, further comprising deleting the object from another queue that ranks the objects based on another policy.

20. The computer-readable medium of claim 13, further comprising accessing metadata that identifies a location within the cache for the object and that identifies a link associated with the object for each of a plurality of queues.

21. The computer-readable medium of claim 20, further comprising deleting the object from the plurality of queues based on the link associated with the object for each queue.

22. A computer-readable medium having computer-executable components with instructions for managing objects within a cache, the instructions comprising:
    a first component configured to download objects from a remote computer to a local computer; and
    a second component configured to;
    obtain a policy associated with the objects, wherein the policy identifies at least two factors for determining a weight for each object,
    determine the weight for each object, wherein the weight is calculated by summing values with an absolute age of the object, and further wherein the values are associated with the factors,
    access a queue corresponding to the policy,
    determine a rank for each object in the queue based on the weight,
    select an object within the queue based on the rank of the object within the queue,
    delete the object from the queue, and
    delete the object from the cache.

23. The computer-readable medium of claim 22, wherein the policy prioritizes the at least two factors based on importance.

24. The computer-readable medium of claim 23, wherein the policy is a group policy applicable to several computers.

25. The computer-readable medium of claim 23, wherein the policy is defined via an XML document.

26. The computer-readable medium of claim 23, wherein the policy is defined via a user interface.

27. A system for managing objects within a cache, comprising:
    a processor; and
    a memory into which a plurality of instructions are loaded, the plurality of instructions performing a method comprising:
        obtaining a policy associated with the objects, wherein the policy identifies at least two factors for determining a weight for each object,
        determining the weight for each object, wherein the weight is calculated by summing values with an absolute age of the object, and further wherein the values are associated with the factors,
        determining a rank for each object based on the weight,
        storing the rank for each object, and
        deleting a low priority object from within the cache, wherein the low priority object has the lowest rank among the objects.

28. The system of claim 27, wherein the factors are associated with at least one of: storage considerations, sensitive information, and the possibility of being accessed again.

29. The system of claim 27, wherein determining the weight further comprises applying an adjustment to each factor associated with the object.

30. The system of claim 29, wherein the relative importance of the factors is obtained from a policy.

31. A system for evicting objects from within a cache, comprising:
    a processor; and
    a memory into which a plurality of instructions are loaded, the plurality of instructions performing a method comprising:
        calculating a weight for an object by summing values with an absolute age of the object, wherein the values are associated with at least two factors;
        locating the object in the cache based on the weight, the weight indicating that the object is the least important object in the cache, and
        deleting the object from the cache.

32. The system of claim 31, wherein the factors are obtained from a policy.

* * * * *